(12) United States Patent
Smith et al.

(10) Patent No.: US 9,297,706 B2
(45) Date of Patent: Mar. 29, 2016

(54) FREEZE INDICATOR EMPLOYING LIGHT SCATTERING AND METHOD OF MAKING SAME

(71) Applicant: Temptime Corporation, Morris Plains, NJ (US)

(72) Inventors: Dawn E. Smith, Martinsville, NJ (US); Brian S. Huffman, Belle Mead, NJ (US); Dene H. Taylor, New Hope, PA (US)

(73) Assignee: TEMPTIME CORPORATION, Morris Plains, NJ (US)

(*) Notice: Subject to any disclaimer, the term of this patent is extended or adjusted under 35 U.S.C. 154(b) by 398 days.

(21) Appl. No.: 13/968,895

(22) Filed: Aug. 16, 2013

(65) Prior Publication Data

US 2014/0048010 A1 Feb. 20, 2014

Related U.S. Application Data

(60) Provisional application No. 61/683,805, filed on Aug. 16, 2012.

(51) Int. Cl.
*G01K 11/12* (2006.01)
*G01K 3/04* (2006.01)

(52) U.S. Cl.
CPC . *G01K 11/12* (2013.01); *G01K 3/04* (2013.01)

(58) Field of Classification Search
CPC ......... G01K 3/04; G01K 11/06; G01K 11/12; G01K 11/14; G01K 11/16
USPC ................................... 116/216; 374/106, 162
See application file for complete search history.

(56) References Cited

U.S. PATENT DOCUMENTS

| | | | |
|---|---|---|---|
| 4,148,748 A | 4/1979 | Hanlon et al. | |
| 4,191,125 A | 3/1980 | Johnson | |
| 4,450,023 A * | 5/1984 | De Blauwe | C09D 11/50 116/201 |
| 5,137,815 A | 8/1992 | Hendricks | |
| 5,191,010 A | 3/1993 | Inagaki et al. | |
| 5,223,412 A | 6/1993 | Wight et al. | |
| 5,239,942 A | 8/1993 | Ignacio et al. | |
| 5,489,521 A | 2/1996 | So et al. | |
| 5,964,181 A | 10/1999 | Pereyra | |
| 6,472,214 B2 | 10/2002 | Patel | |
| 6,837,620 B2 | 1/2005 | Shahinpoor | |

(Continued)

OTHER PUBLICATIONS

Turner et al., "Components of Ice Nucleation Structures of Bacteria", Journal of Bacteriology, Oct. 1991, vol. 173, No. 20, pp. 6515-6527.

(Continued)

*Primary Examiner* — Richard A. Smith
(74) *Attorney, Agent, or Firm* — K&L Gates LLP

(57) ABSTRACT

A freeze indicator including an indicator dispersion is described herein. Such an indicator dispersion can include: a liquid medium and particles of a colored indicator agent dispersed in the liquid medium. The colored indicator agent particles having an inherent color; wherein the indicator dispersion exhibits the inherent color of the colored indicator agent particles after freezing and is configured to have a less colored appearance before freezing and wherein light scattering masks the inherent color of the colored indicator agent particles before freezing. Some indicator dispersions can be free of color-changing chemical co-reactants. These freeze indicators can be small, have a low cost, and have a simple configuration.

20 Claims, 1 Drawing Sheet

(56) References Cited

U.S. PATENT DOCUMENTS

| | | |
|---|---|---|
| 6,957,623 B2 | 10/2005 | Guisinger |
| 7,343,872 B2 | 3/2008 | Taylor et al. |
| 7,490,575 B2 | 2/2009 | Taylor et al. |
| 7,571,695 B2 | 8/2009 | Taylor et al. |
| 7,624,698 B2 | 12/2009 | Taylor et al. |
| 7,891,310 B2 | 2/2011 | Taylor et al. |
| 8,122,844 B2 | 2/2012 | Smith et al. |
| 8,128,872 B2 | 3/2012 | Lentz et al. |
| 2008/0110391 A1 | 5/2008 | Taylor et al. |
| 2008/0257251 A1 | 10/2008 | Taylor et al. |
| 2009/0186209 A1 | 7/2009 | Padiyath et al. |
| 2010/0020846 A1 | 1/2010 | Kagan et al. |
| 2010/0162941 A1 | 7/2010 | Lentz et al. |
| 2012/0079980 A1 | 4/2012 | Taylor et al. |
| 2014/0044609 A1* | 2/2014 | Prusik .................. G01K 11/12 422/429 |
| 2015/0090623 A1* | 4/2015 | Grabiner ............. B65D 51/245 206/459.1 |

OTHER PUBLICATIONS

Jung et al., "Expression of carboxymethylcellulase on the surface of *Escheirichia coli* using Psuedomonas syringae ice nucleation protein", Enzyme and Microbial Technology, 199.

Vali, Ice Nucleation—Theory. A Tutorial. For Presentation at the NCAR/ASP 1999 Summer Colloquium, pp. 1-22, Jun. 25, 1999.

Freezing Points Table of Glycerine-Water Solutions, Downloaded on Aug. 26, 2009 from http://www.dow.com/glycerine/resources/table8.htm.

Wolber, et al., "Identification and purification of a bacterial ice-necleation protein", Proc. Natl. Acac. Sci USA, vol. 83, pp. 7256-7260, Oct. 1986.

"Snomax" home webpage, Johnson Controls Inc., Downloaded on Jul. 31, 2009.

"Snomax FAQ's" webpage, Johnson Controls, Inc.

Search Report and Written Opinion dated Jan. 29, 2014 for International PCT Application No. PCT/US13/55364.

* cited by examiner

FREEZE INDICATOR EMPLOYING LIGHT SCATTERING AND METHOD OF MAKING SAME

PRIORITY CLAIM AND CROSS-REFERENCE TO A RELATED APPLICATION

This application claims the benefit of provisional patent Application No. 61/683,805, filed on Aug. 16, 2012, the entire disclosure of which is incorporated by reference herein for all purposes.

The present disclosure relates, inter alia, to a freeze indicator for monitoring past exposure of a host product to a freezing temperature, and to a method of manufacturing such a freeze indicator.

BACKGROUND

Many commercial products are freeze-sensitive and may lose efficacy or quality if they experience freezing temperatures before use. Examples of freeze-sensitive commercial products include certain pharmaceuticals, medical products, and foodstuffs as well as some industrial products. Accordingly, various freeze indicators have been provided that can monitor freeze exposure and signal when a freezing, or near-freezing event has occurred. The signal can be a color change, for example, a change in the color of an indicator area, and can be generated by an indicator dispersion that coagulates upon freezing to provide the color change. Some examples of known freeze indicators are described in U.S. Pat. No. 8,128,872 to Lentz et al., U.S. Pat. No. 8,122,844 to Smith et al., U.S. Pat. Nos. 7,891,310; 7,624,698; 7,571,695; 7,490,575 and 7,343,872 to Taylor et al. and U.S. Patent Application Publication No. 2012/0079980 by Taylor et al. (Taylor '980 herein). The disclosure of Taylor '980 is incorporated by reference herein.

While known freeze indicators may be satisfactory for their intended purposes, nevertheless, a need exists for a freeze indicator having new characteristics.

BRIEF SUMMARY

It would be desirable to provide a freeze indicator, of the type employing an indicator dispersion including an aqueous liquid medium, that can provide a distinct color change in small, low cost embodiments, in which the indicator dispersion has a simple configuration.

Some embodiments include an indicator dispersion comprising: a liquid medium; and particles of a colored indicator agent dispersed in the liquid medium, the colored indicator agent particles having an inherent color; wherein the indicator dispersion exhibits the inherent color of the colored indicator agent particles after freezing and is configured to have a less colored appearance before freezing and wherein light scattering masks the inherent color of the colored indicator agent particles before freezing; and wherein the indicator dispersion is free of color-changing chemical co-reactants.

Some embodiments include an indicator dispersion comprising: a liquid medium; and liquid particles of a colored indicator agent dispersed in the liquid medium, the colored indicator agent particles having an inherent color; wherein the indicator dispersion exhibits the inherent color of the colored indicator agent particles after freezing and is configured to have a less colored appearance before freezing and wherein light scattering masks the inherent color of the colored indicator agent particles before freezing.

With respect to an indicator dispersion above, in some embodiments, the indicator dispersion is free of color-changing chemical co-reactants. In some embodiments, the liquid medium is a hydrophobic liquid medium. In some embodiments, the liquid medium is an aqueous liquid medium.

Some embodiments include a freeze indicator having a housing and the indicator dispersion disposed within the housing. The housing can be configured for the indicator dispersion to be optically readable externally of the freeze indicator.

Some embodiments include a freeze indicator having a housing and an indicator dispersion disposed within the housing. The housing can be configured for the indicator dispersion to be optically readable externally of the freeze indicator. The indicator dispersion can include an aqueous liquid medium and particles of a colored indicator agent dispersed in the aqueous liquid medium. The colored indicator agent particles can have an inherent color and the indicator dispersion can exhibit the inherent color of the colored indicator agent particles after freezing. Also, the indicator dispersion can be configured to have a less colored appearance before freezing wherein light scattering masks the inherent color of the colored indicator agent particles before freezing. The light scattering can be random scattering of incident light. Further, in some cases, the light scattering can give the indicator dispersion a whitish appearance. Further, the indicator dispersion can coagulate in response to exposure to a freezing temperature.

In some embodiments of the freeze indicator the colored indicator agent particles include a colorant dissolved in a hydrophobic liquid, for example, an oil. In another embodiment of the freeze indicator the colored indicator agent particles include solid particles of colorant dispersed in a hydrophobic liquid, for example, an oil. In other embodiments, the colored indicator agent particles can include solid particles of a colorant dissolved or dispersed in a solid material.

Some embodiments include a freeze indicator including a housing and an indicator dispersion within the housing. The housing can be configured for the indicator dispersion to be optically readable externally of the freeze indicator. The indicator dispersion includes an aqueous liquid medium and liquid particles of a colored indicator agent dispersed in the aqueous liquid medium. The colored indicator agent particles can include a colorant dissolved in a hydrophobic liquid and can have an inherent color. The indicator dispersion can exhibit the inherent color of the colored indicator agent particles after freezing and can be configured to have a less colored appearance before freezing. Light scattering, or another suitable phenomenon can mask or conceal the inherent color of the colored indicator agent particles before freezing.

In one embodiment of freeze indicator, the colorant is a dye and the hydrophobic liquid is an oil. The colored indicator agent particles can be homogenous, for example, all or essentially all the particles can have essentially the same composition as each other. Also, there can be no other indicator particles present in the indicator dispersion or there can be an absence from the indicator dispersion of other indicator particles that could participate in a change in appearance of the freeze indicator in response to freezing. Further, the indicator dispersion can be free of color-changing chemical co-reactants, if desired.

Some embodiments include a method of making a freeze indicator including dispersing particles of a colored indicator agent in an aqueous liquid medium to provide an indicator dispersion and configuring the indicator dispersion to have less color before freezing. The method can also include loading the indicator dispersion into a housing that permits the indicator dispersion to be optically readable externally of the freeze indicator. The colored indicator agent particles can imbue the indicator dispersion with a appearance after freezing.

In some freeze indicator embodiments, the colored indicator agent particles can have an average particle size of at least about 100 nm or at least about 200 nm. Alternatively, or in addition, to any of the foregoing minimum proportions, the colored indicator agent particles can have an average particle size not more than about 2 μm, or of not more than about 1.2 μm. Optionally the average particle size can be in a range of from about 200 nm to about 500 nm. The method can include configuring the indicator dispersion to have any average particle size corresponding with one or more of these criteria.

In this method, the indicator dispersion can exclude or be free of color-changing chemical co-reactants. Also, the indicator dispersion can coagulate in response to exposure of the indicator dispersion to a freezing temperature.

Embodiments of freeze indicators can provide a distinct color change in small, low cost units suitable for monitoring host products for possible freeze exposure. A variety of different colored indicator agent particles, which can employ various colorants, can be employed, providing a range of options for practicing the invention. The indicator dispersion can have a simple configuration and the invention includes simple methods of making freeze indicators.

Some embodiments include a label for a perishable good, comprising a freeze indicator described herein.

Some embodiments include a package for a perishable good, comprising a freeze indicator described herein.

Some embodiments include a package containing a perishable good, comprising a freeze indicator described herein.

Some embodiments include a method of protecting a perishable item, comprising coupling the perishable item with a freeze indicator described herein so that the freeze indicator is subject to substantially the same temperature conditions as the perishable item. Such a method may further comprising inspecting the freeze indicator for the detectable and irreversible change in the apparent color of the indicator dispersion. If desired, the item could be discarded if the detectable and irreversible change in the apparent color of the indicator dispersion is detected.

Some embodiments include use of a freeze indicator described herein in monitoring the quality of a perishable good.

Some embodiments include a method of detecting a freezing event, comprising subjecting a freeze indicator of described herein to conditions under which a freezing event might occur, and observing whether a detectible and irreversible change in the apparent color of the indicator dispersion occurs.

BRIEF DESCRIPTION OF THE SEVERAL VIEWS OF THE DRAWING

Some embodiments, and ways of making and of using one or more embodiments, are described in detail herein and, by way of example, with reference to the accompanying drawings (which are not necessarily drawn to scale with regard to any internal or external structures shown), in which like reference characters designate like elements throughout the several views, and in which.

DETAILED DESCRIPTION

Figure 1:
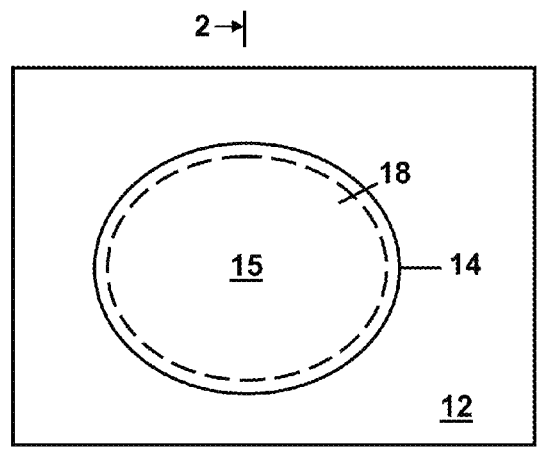
FIG. 1 is a plan view of a freeze indicator employing light scattering according to one embodiment.

Administration of vaccines provides a cost-effective health intervention that can save or improve, millions of lives globally. The biological activity of vaccines is attributable to complex organic macromolecules, for example, proteins, having particular three-dimensional conformations. When exposed to freezing temperatures, or in some cases, to near-freezing temperatures, vaccines can lose potency because the low temperature destroys the particular conformation of one or more essential organic macromolecules in the vaccine composition. A low-potency vaccine, if administered to a subject, may fail to protect the subject from a serious or fatal disease.

Because warm temperatures also can affect vaccine quality adversely, vaccines are generally refrigerated, or cooled by other means, during storage and distribution to end users. Such cooling means introduce a risk that some or all vaccine samples in a batch of samples may suffer exposure to freezing or near-freezing temperatures due to cold spots within a container, poorly controlled refrigeration, or other factors. Similar considerations apply to various other commercial products, for example, biological pharmaceuticals and some genetically engineered pharmaceuticals, as well as certain foodstuffs, and other commercial products, some of which are described elsewhere herein.

To help mitigate this problem, a freeze indicator can be associated with a vaccine, or another host product, to provide an optical signal alerting a health worker, or other end user, that the vaccine may have lost potency and possibly should not be used.

Taylor '980 describes various freeze indicators that can be embodied in small, low cost, label-like configurations suitable for mass-production and adhered to, or otherwise associated in close proximity, with host products such as vaccine vials or syringes.

Taylor '980 describes, inter alia, a freeze indicator that includes a color-changing emulsion employing first and second reactant phases dispersed in a dispersion medium that can be an aqueous liquid. The first and second reactant phases can include a first reactant and a second reactant that can co-react in response to exposure to a freezing temperature, changing the color of the color-changing emulsion irreversibly. As described, various co-reactants can be employed, some of which can provide an intense color change and good contrast between the after-freezing appearance and the initial appearance of the freeze indicator.

For some purposes, it would be desirable to provide a low-cost freeze indicator suitable for use with vaccines and other host products that includes an indicator dispersion having a simple composition and having an after-freezing appearance that contrasts well with the before-freezing appearance of the indicator dispersion. Other characteristics that would be useful, in some cases, include having an indicator dispersion that is easy to manufacture, and an ability to be configured as a label, optionally, as a thin flexible label.

To address such needs, some embodiments include a freeze indicator employing an indicator dispersion that includes an aqueous liquid medium, or a hydrophobic liquid medium, in which particles of a colored indicator agent are dispersed and in which the indicator dispersion can be configured to have a less colored appearance before freezing and a more colored appearance after freezing. The colored indicator agent particles can have an inherent color that provides the more colored after-freezing appearance, and, for simplicity, the indicator dispersion can exclude, or be free of, color-changing chemical co-reactants. Such an indicator can provide the benefits of simplicity, ease of manufacture, and/or a good color contrast between the after-freezing appearance and the before-freezing appearance.

For example, some embodiments of freeze indicators can include an indicator dispersion that has a single phase of colored indicator agent particles dispersed in the aqueous (or hydrophobic) liquid medium, the single phase of colored indicator agent particles being the only dispersed phase in the indicator dispersion. The particles in the single phase of colored indicator particles can be homogenous, with essentially similar compositions to each other. Such embodiments of freeze indicator are unlike freeze indicators that employ two different reactive phases dispersed in an aqueous liquid medium. Some embodiments include a freeze indicator wherein the colored indicator agent particles consist of a single colorant dissolved or dispersed in a single hydrophobic liquid or a single solid dispersed in an aqueous liquid medium. Such indicator dispersions can include an ice nucleant, a dispersion stabilizer, a protein stabilizer, a low-temperature destabilizer and/or a biocide as an optional ingredient or ingredients.

Some examples of materials that can be excluded from the indicator dispersion to assure that the indicator dispersion include no color-changing chemical co-reactants are: a chemical reactant that can co-react with the colored indicator agent particles and chemically modify the color of the particles, for example, a color-depleting agent; a color precursor accompanied by a color developer; and a color-changing chemical reactant that can react with another component of the freeze indicator to provide color. Avoidance of such materials can simplify the configuration of the indicator dispersion and can reduce issues that may sometimes arise, for example, undesired background color in the before-freezing appearance of the indicator dispersion.

In a multi-phase system that includes color-changing chemical reactants, for example, an oil-in-water dispersion or a water-in-oil dispersion, chemical reactants included in the oil phase may migrate into the aqueous phase. Migration of color-changing chemical reactants into, and/or through, the aqueous phase can lead to a premature color changing reaction that may confuse the indicator signal, in some cases, for example, by darkening the initial color of the indicator dispersion and reducing the contrast between the before and after appearances of the indicator.

Indicator dispersions employed in freeze indicator embodiments can be configured to utilize light scattering to mask or conceal the inherent color of the colored indicator agent particles by adjusting the average particle size of the hydrophobic material to have values conducive to light scattering. The particle size can be configured to cause the indicator dispersion to have an appearance that is different from the inherent color of the colored indicator agent particles as a result of a phenomenon other than light scattering if such other phenomenon provides a distinct contrast between the before-freezing appearance of the indicator dispersion and the after-freezing appearance of the indicator dispersion. In the case of an emulsion, increasing the intensity and/or the duration of homogenization during manufacture usually will decrease the particle size of the indicator dispersion. Higher agitation speeds and/or more sophisticated equipment usually can be employed to increase the intensity of homogenization, as will be known to a person of ordinary skill in the art. Suitable dispersions can be fabricated by comparable methods.

Use of a hydrophobic material having a relatively high refractive index, for example, greater than about 1.45 or 1.5, can help provide a less colored, a more opaque, or lighter colored dispersion, in some cases. Some examples of hydrophobic materials having useful refractive indexes are vegetable oils such as olive oil and sunflower oil, which have refractive indices of about 1.47, and mineral oil, which has a refractive index of about 1.48. Hydrogenated terphenyl oils, which have higher refractive indices of about 1.52, may provide more opacity or lightness and can be employed also.

The intensity of the color of the dispersed phase (colorant in oil or water itself) can be varied to affect the distinction between the indicator states before and after freezing. Color intensity of liquids can be measured with densitometry, spectrometry or by comparison to visual standards. The color intensity obtained by a 1 cm thick liquid is its absorbance. When absorbance is to be measured by spectroscopy a wavelength can be selected that corresponds to the color. For example if the colorant is red the color absorbance can be measured at 700 nm; if blue, the color absorbance can be measured at 475 nm. Black or gray may be measured at any wavelength in the visible spectrum, but it may be convenient to measure at 500 nm. The actual color intensity of a colorant solution or dispersion is dependent upon both the concentration of the colorant and the relative strength of the colorant. Useful ranges for the absorbance of black liquids are 1 to 30, 2 to 20, or 3 to 10. In some embodiments, a colored indicator agent, such as a hydrophobic oil containing a colorant, has an absorbance at 500 nm of about 1 to about 30, about 2 to about 15, or about 3 to about 10.

The concentration of colorant can be varied for different colorants, having different color intensities, that may be utilized in the colored indicator agent particles, to provide a strong post-freezing color and a distinct color change. Alternatively, or in addition, to any of the foregoing minimum proportions, the proportion of colorant can be not more than about 1.0 percent, not more than about 0.1 percent or not more than about 0.05 percent by weight. Optionally, the proportion can be from about 0.001 percent to about 0.01 percent. The proportion of colorant can be decreased to reduce color in the before-freezing appearance, if present, or can be increased to increase color in the after-freezing appearance, if desired. Any such proportion of colorant can be employed in a method embodiment.

Indicator dispersions employed in freeze indicator embodiments of the invention can have various proportions of colored indicator agent particles, for example, a proportion by weight based upon the weight of the indicator dispersion of at least about 0.0005 percent, or at least about 0.002 percent, at least about 0.01 percent, at least about 0.05 percent. Alternatively, or in addition, to any of the foregoing minimum proportions, the proportion of colorant can be not more than about 1.0 percent, not more than about 0.1 percent or not more than about 0.05 percent by weight. Optionally, the proportion can be from about 0.001 percent to about 0.01 percent.

The proportion of colorant can be decreased to reduce color in the before-freezing appearance, if present, or can be increased to increase color in the after-freezing appearance, if desired. Any such proportion of colorant can be employed in a method embodiment of the invention. Indicator dispersions employed in freeze indicator embodiments can have various proportions of colored indicator agent particles, for example, a proportion by weight based upon the weight of the indicator dispersion of at least about 50 percent, or at least about 30 percent, at least about 20 percent, at least about 5 percent.

Further, indicator dispersions employed in some freeze indicators embodiments can consist only of an aqueous liquid medium and colored indicator agent particles, or can include one or more optional additional ingredients such as a dispersion stabilizer and an ice nucleant. A suitable dispersion stabilizer or stabilizers, if employed, can stabilize the indicator dispersion at above-freezing temperatures and permit the indicator dispersion to collapse at or below freezing temperatures. A suitable ice nucleant can help control supercooling and raise the temperature at which the indicator dispersion begins to freeze to be closer to the melting point of the aqueous liquid medium. Some additional ingredients that can be included are a low-temperature destabilizer, a protein stabilizer, and a biocide, as described elsewhere herein.

The terms "coagulate" and the grammatical variations thereof, including "coagulating" and "coagulation", are used in this specification to refer to gathering together, or forming into a mass or a group, where the part all remain distinct.

The terms "coalesce" and the grammatical variations thereof, including "coalescing" and "coalescence" are used in this specification to refer to growing together, uniting or joining together, into one body, product, mass, or becoming integrated into a whole. In the cases of the emulsions described herein, coalescence can be understood generally, but not always, to be preceded by coagulation. It will be understood that a freeze indicator dispersion that coalesces can coalesce into more than one body or masses of coalesced particles.

The term "color" is used herein to refer to achromatic visual appearances, for example, black, gray, and white, and chromatic visual appearances, including primary color hues, secondary color hues and/or other color hues, for example, without limitation, red, yellow, green, blue, purple, orange, and brown. The terms "color change" and its grammatical variants, or equivalents, are used to refer to changes in hue, intensity or lightness (or darkness) or other changes in visual appearance. A "light" appearance or a "dark" appearance refers to the grayscale appearance without reference to any hue that may, or may not, be present. A "more colored" appearance refers to a color that is more readily discernable as compared to an appearance that either colorless or white. For example, a light yellow or a pink color is more colored than white.

The terms "particle" and "particles" used herein in regard to a dispersion includes both solid particles and liquid particles.

The term "dispersion" is used herein to refer to a dispersion of solid particles in a liquid medium, or a dispersion of liquid particles, in a liquid medium. The term "emulsion" is used herein to refer to a dispersion of liquid particles in a liquid medium, for example, an oil-in-water emulsion or a water-in-oil emulsion.

Some examples of color changes that can be exhibited by some freeze indicators include changes between any two of white, gray, black, red, yellow, blue, green, purple, orange and brown, and any tints and shades of the foregoing colors. Some embodiments of freeze indicator can exhibit a change from white, light or colorless before freezing to yellow, orange, green, red, black or violet after freezing.

The term "freezing temperature" is used herein to refer to a temperature that will cause an aqueous freeze indicator dispersion medium, such as is described herein, to form ice crystals.

The term "freeze" and grammatical variations thereof, including "freezing," is used to refer to the freezing of water.

The term "optical density" (OD) as used herein refers to the log to the base 10 of the inverse of the incident light reflected from a sample. OD can be expressed by the formula $$OD_\lambda = \log_{10}(I_0/I)$$

where I is the intensity of light at a specified wavelength λ that is reflected by a sample and $I_0$ is the intensity of the light before it enters the sample.

The term "water" is used herein to include deuterium oxide and deuterated water as well as ordinary "light" water.

In some embodiments, suitable indicator dispersions can be formulated as a simple oil-in-water emulsion or a water-in-oil emulsion. Some embodiments can employ a simple dispersion of hydrophobic particles in water. Before freezing, notwithstanding that a colorant is present, such an indicator dispersion can scatter light, appearing light, less colored, or white in color. The appearance of the indicator dispersion can also be opaque, in some cases. Light scattering can mask or conceal the inherent color of the colored indicator agent particles that are present in the indicator dispersion. The light scattering can be random scattering of incident light.

Upon exposure of the freeze indicator to a freezing temperature, freezing of water can cause coalescence of oil particles in the emulsion. In response to freezing, the emulsion can sometimes break into two phases that are largely or entirely coalesced into two distinct volumes, one of which volumes displays the color of the colored indicator agent particles. In other cases, the oil particles can coalesce on thawing of the aqueous phase into multiple larger particles, bodies or masses that exhibit the inherent color of the colorant, for example by reflection of incident light. Similarly, in response to freezing, a solid particle dispersion can break, causing coagulation of the solid particles in the indicator dispersion into masses that no longer scatter light strongly, but display the inherent color of the colored indicator agent particles in the indicator dispersion. The colored indicator agent particles can become irreversibly coagulated after freezing.

A surprisingly intense color change can be obtained in some freeze indicator embodiments that employ relatively simple indicator dispersions, as described herein, by utilizing a suitable concentration of an appropriate colorant. For example, the after-freezing appearance of a layer of the indicator dispersion having a thickness of 1 mm can be at least 0.4 optical density ("OD") units darker than the before-freezing appearance of the layer of the indicator dispersion.

Effective masking of intense color by light scattering in freeze indicator embodiments using relatively simple indicator dispersions, as described herein, also is unexpected. Further, some embodiments of freeze indicator surprisingly can employ an intense colorant, for example, an opaque black dye, yet have a before-freezing appearance that is white and largely or completely free of background color, cast, or tinge. Using an opaque black dye, the before-freezing appearance in such embodiments does not appear to be gray.

Freeze indicators embodiments can be formulated with a variety of color options, as a variety of different colorants can be used, including, for example, various oil-soluble dyes and various water-insoluble pigments. Moreover, the simplicity of the indicator dispersions that can be employed makes a range of options available for the configuration of the indicator dispersion and for the materials employed. For example, a diversity of colored indicator agents can be employed, and other ingredients, such as hydrophobic liquids, solid materials, dispersion stabilizers, and ice nucleants, if present, can be selected from a range of acceptable candidates.

While simplicity may have benefits, the invention is not limited to simple embodiments.

Colored indicator agent particles employed in freeze indicator embodiments can have various particle sizes, for example, an average particle size of at least about 100 nm or at least about 200 nm. The average particle size can be not more than about 1.2 µm, or not more than about 2 µm. Optionally, the average particle size can be from about 100 nm to about 400 nm.

Freeze indicator embodiments can be configured to be associated with a host product to monitor the host product for exposure to a freezing temperature. For this purpose, the freeze indicator can include a substrate supporting the housing and the substrate can be adapted to be affixed to the host product or to a package or other container for the host product. For example, the substrate can have a coating of a pressure-sensitive adhesive to secure the freeze indicator to the host product or the container. The pressure-sensitive adhesive can be protected with a release liner prior to application of the freeze indicator to a host product, or to a container for the host product. Alternatively, the freeze indicator can be affixed to the host product by a tie or other means, or can be inserted in the container for the host product, if a container is employed.

The substrate, if a substrate is employed, or another element of the freeze indicator can bear a reference area colored, for example, by printing, to show the after-freezing appearance of the indicator, if desired. Further, the substrate can bear printed indicia providing instructions for use, indications of origin, host-product information, marketing information, and/or other desired material.

Optionally the housing and substrate, if employed, can be flexible to facilitate attachment of the freeze indicator to a curved surface of a host product and to enable the freeze indicator to conform with the curved surface.

Freeze indicator embodiments can be mass produced using packaging machinery and packaging methods, or the like. In one method of manufacture, freeze indicators can be assembled into individually die-cut items mounted with pressure sensitive adhesive on continuous lengths of release liner in sheet or roll form. The sheets or rolls of freeze indicator can be manipulated like labels and can be applied to host products or their containers using appropriately modified mechanical label applicators.

As noted previously herein, in some embodiments, the colored indicator agent particles can include a colorant dissolved or dispersed in a hydrophobic liquid, or in a solid material.

Colorant.

For hydrophobic colored indicator agent particles, the colorant can be, or can include one or more oil-soluble dyes or oil-dispersible pigments. A dye or dyes having a low water-solubility can be employed. Good oil solubility of the dye can enhance the color intensity of the post-freezing appearance of the indicator dispersion. Low water solubility can avoid or reduce possible migration of the dye or pigment into the aqueous liquid medium, which may cause premature coloration of the indicator dispersion. For example, the dye can have a water solubility of not more than about 10 mg/mL, not more than about 1 mg/mL, or not more than about 0.1 mg/mL. Suitable oil-solubilities for useful dyes can vary and can be, for example, at least about 10 mg/mL, at least about 50 mg/mL or at least about 100 mg/mL. Usefully, the dye can have substantially greater solubility in oil than in water. For example, the dye can be at least two times, at least five times, at least ten times, at least fifty times or at least one hundred times more soluble in oil than in water, the solubilities being solubilities by weight.

For aqueous colored indicator agent particles, the colorant can be, or can include one or more water-soluble dyes or water-dispersible pigments. A dye or dyes having a low oil-solubility can be employed. Good water solubility of the dye can enhance the color intensity of the post-freezing appearance of the indicator dispersion. Low oil solubility can avoid or reduce possible migration of the dye or pigment into the hydrophobic liquid medium, which may cause premature coloration of the indicator dispersion. For example, the dye can have an oil solubility of not more than about 10 mg/mL, not more than about 1 mg/mL, or not more than about 0.1 mg/mL. Suitable water-solubilities for useful dyes can vary and can be, for example, at least about 10 mg/mL, at least about 50 mg/mL or at least about 100 mg/mL. Usefully, the dye can have substantially greater solubility in water than in oil. For example, the dye can be at least two times, at least five times, at least ten times, at least fifty times or at least one hundred times more soluble in water than in oil, the solubilities being solubilities by weight.

Various colors can be employed for the colorant. Red, orange, and black are examples of colors that can help signal that an adverse condition may have arisen, and are advantageous as they follow common conventions for indicating unsatisfactory or dangerous conditions, or as a warning. Some examples of suitable dyes include: solvent dyes. Solvent Blue 35, an anthraquinone solvent dye that has a low water-solubility of about 6 mg/mL; Solvent Green 3 an aminoanthraquinone solvent dye that is only sparingly soluble in water, having a water-solubility of about 0.9 mg/mL; Solvent Black 3, also called Sudan Black B, a disazo solvent dye having two functional azo (—N=N—) groups that also is only sparingly soluble in water, with a water-solubility of about 0.1 mg/mL; Oil Red O; and Victoria Blue B both available from Sigma-Aldrich, (St. Louis, Mo.); and KEYPLAST (trademark) Liquid Oil Red HF, KEYPLAST Black 2B and KEYPLAST Black AN available from Keystone Aniline Corporation. Additional information regarding further useful oil-soluble dyes, common names, chemical structures and water solubilities of useful dyes can be found, for example, in Floyd J. Green "Handbook of Stains, Dyes, and Indicators," The Aldrich Chemical Company (1991).

Some examples of suitable pigments include carbon black, iron oxide or ultramarine. A pigment employed can be treated to enhance the dispersibility of the pigment in a hydrophobic material, if desired, for example, by coating the pigment particles with a hydrophobic coating. A pigment employed can be treated to enhance the dispersibility of the pigment in an aqueous medium, if desired, for example, by coating the pigment particles with a hydrophilic coating.

Other suitable colorant colors, dyes, and pigments will be apparent to a person of ordinary skill in the art, or will become apparent as the art develops.

Hydrophobic Liquid.

Hydrophobic liquids that can be employed can be liquids that are dispersible in the aqueous liquid medium, or in which water can be dispersed, without undue difficulty, as components of the colored indicator agent particles. Desirably, the hydrophobic liquid can be capable of adopting a particle size that can mask the inherent color of the colored indicator agent particles, or that can otherwise produce a suitable difference in appearance after freezing. Some suitable hydrophobic liquids are liquid at freezing temperatures (and therefore also at higher temperatures), for example, at temperatures down to 0° C., −5° C., or −10° C. However, a hydrophobic liquid that is liquid at ordinary ambient temperatures but which is frozen at or near 0° C. can also be used, if solid particles of the frozen hydrophobic liquid can be coagulated into visible agglomerates or masses. Such aggregates may coalesce on melting of the frozen hydrophobic liquid and increase the difference in appearance following freezing and thawing.

Some examples of suitable hydrophobic liquids include, inter alia, natural oils and synthetic oils. Some useful hydrophobic liquids are water-immiscible or tend to repel, or not absorb, water, and/or have a lack of affinity for water. A useful hydrophobic liquid can be a hydrophobic liquid that is unreactive with other components of the indicator dispersion, or with any housing or containment material that the freeze indicator may employ to contain the indicator dispersion and that contacts the indicator dispersion. More particularly, but not exclusively, the hydrophobic liquid can be unreactive with the colorant. Examples of suitable hydrophobic liquids include mineral oil, terphenyl oils, vegetable oils, soy bean oil, cottonseed oil, linseed oil, rape seed oil, castor oil, sunflower oil, olive oil, canola oil, peanut oil, corn oil, and silicone oils or silicone fluids, for example, siloxanes, polysiloxanes cyclopolysiloxanes, and dimethicone. One suitable partially hydrogenated terphenyl oil is available under the product code MCS 2811 from Solutia, St. Louis, Mo. A mixture of two or more hydrophobic liquids also can be used. Some further suitable hydrophobic liquids are described in Taylor '980.

One advantage of using a water-in-oil emulsion as an indicator dispersion is that the freezing point of an oil medium is more flexible than that of an aqueous medium because oils have a much greater range of melting points than aqueous solutions. In some embodiments, the aqueous medium is a hydrophobic liquid having a melting point of about 0° C. to about 100° C., about 2° C. to about 20° C., about 5° C. to about 20° C., about 5° C. to about 10° C., about 10° C. to about 15° C., or about 15° C. to about 20° C.

Solid Material.

In other embodiments, the colored indicator agent particles can include a colorant dissolved or dispersed in a solid material. Examples of suitable solid materials, which, optionally, can be soft, as described herein, include various hydrophobic materials, various wax materials, such as, paraffin wax, microcrystalline wax, carnauba wax, beeswax, Chinese wax, shellac wax, spermaceti, tallow, palm wax, soy wax, and lanolin and mixtures of two or more wax materials. Further examples of suitable solid materials include various synthetic polymers and copolymers, such as, polyethylene, polypropylene, polyvinylidene, and polyvinylchloride and mixtures of two or more polymers and or copolymers. In further embodiments, the colored indicator agent particles can be solid particles of a colorant dispersed in a hydrophobic liquid or in a solid material. The colorant can be a pigment, or a water-insoluble dye, that normally exists in the solid state at temperatures at which a freeze indicator may be used, for example, up to about 50° C.

Aqueous Liquid Medium.

The aqueous liquid medium can include, or consist of, any suitable aqueous liquid for example, water. Optionally, one or more water-miscible liquids having a melting point higher than that of water can be included in the aqueous liquid medium, for example deuterium oxide, deuterated water or a mixture of deuterium oxide and deuterated water. In some embodiments of freeze indicator, the aqueous liquid medium can include at least about 90 percent by weight, based on the weight of the aqueous liquid medium, of deuterium oxide, for example, 100 percent, or another suitable proportion. The aqueous liquid medium can be configured to have a melting point related to a temperature condition to be monitored by suitable selection of aqueous ingredients and their proportions. The aqueous liquid medium can be colorless, and can be free of added colorants, other than the colored indicator agent particles, if desired. Alternatively, a desired colorant can be included in the aqueous liquid medium, by dissolution, or in another suitable manner. Some suitable aqueous liquid media are also described in Taylor '980, for example, in paragraphs 0188-0198.

Ice Nucleant.

Indicator dispersions employed in freeze indicator embodiments also can include an ice nucleant to help overcome supercooling and provide a freeze response at a temperature closer to the melting point of the dispersion medium than would occur if the ice nucleant were not present. An ice nucleant can reduce the effect of supercooling, elevate the freezing temperature of the aqueous dispersion medium, and therefore of the indicator dispersion, and narrow the difference between the melting point and the freezing point of the indicator dispersion.

Useful ice nucleants include inorganic ice nucleants and proteinaceous ice nucleants derived from microorganisms. Some examples of useful inorganic ice nucleants include silver iodide, cold-precipitated silver iodide/silver bromide mixtures and copper sulfide. An example of a useful proteinaceous ice nucleant is SNOMAX (trademark) snow inducer, a freeze-dried proteinaceous material available from Johnson Controls Inc., Milwaukee, Wis., www.johnsoncontrols.com. Some suitable ice nucleants are also described in Taylor '980, for example, at paragraphs 0322-0327.

Protein Stabilizer.

Freeze indicator embodiments that employ a proteinaceous ice nucleant can include a protein stabilizer in the indicator dispersion to stabilize the ice nucleant against thermal or other degradation, if desired. Some examples of suitable protein stabilizers include formaldehyde, glutaraldehyde ($CHO.CH_2CH_2CH_2.CHO$), and other dialdehydes having no more than ten carbon atoms. Some suitable protein stabilizers are also described in Taylor '980, for example, at paragraphs 0328 and 0329.

Biocide.

A biocide can be included in the indicator dispersion of a freeze indicator embodiment that employs a proteinaceous ice nucleant, to prevent microbial spoilage, if desired. Certain protein stabilizers, for example, glutaraldehyde and other dialdehydes, can also serve as biocides, when used in an effective stabilizer concentration. Other biocides that can be employed, will be known, or apparent, to a person of ordinary skill in the art, in light of this disclosure.

Dispersion Stabilizer.

To help maintain the stability of the indicator dispersion, freeze indicator embodiments, can include a dispersion stabilizer. Optionally, the freeze indicator also can include a destabilizer to facilitate low-temperature destabilization of the indicator dispersion, if a dispersion stabilizer is present.

Some examples of suitable dispersion stabilizer include, surfactants, anionic surfactants, cationic surfactants, phosphate surfactants, zwitterionic surfactants, non-ionic surfactants, or a mixture of one or more surfactants of similar type. As used herein, the term "non-ionic surfactant" includes surfactants that are sometimes referenced in the art as "nonpolar."

Some examples of particular surfactants that can be employed as dispersion stabilizers in freeze indicator embodiments include sodium stearate, sodium dodecyl sulfate, dioctyl sulfosuccinate, ammonium lauryl sulfate, lecithins, sodium dilauryl phosphate, betaine, lauryl amido propyl dimethyl betaine, dodecyl trimethyl ammonium chloride, benzalkonium chloride, sorbitan monolaurate, and oleyl alcohol. Some further suitable dispersion stabilizers are also described in Taylor '980, for example, at paragraphs 0275-0301.

Any suitable amount of surfactant can be used to stabilize the dispersion, such as about 0.01% to about 10%, about 0.1% to about 5%, about 0.1% to about 1%, about 0.1% to about 0.5% or about 0.3% to about 0.4% by weight, based upon the weight of the dispersion.

Low-Temperature Destabilizer.

Indicator dispersions employed in freeze indicator embodiments also can include a low-temperature destabilizer to promote or enhance coagulation of the freeze indicator dispersion at freezing temperatures, without unacceptably impairing the warm temperature stability properties of the dispersion, if desired.

The low-temperature destabilizer can be a concentration-sensitive destabilizing or coagulating agent, for example, an ionic compound or compounds, or another suitable compound or compounds such as a high molecular weight compound. The destabilizing action of the low-temperature destabilizer can depend upon the concentration of the destabilizer in the aqueous liquid medium. Generally, although not necessarily, a dispersion stabilizer also is present when a low-temperature destabilizer is employed.

Various materials can be employed as low-temperature destabilizers including various salts, such as inorganic salts, monovalent salts, and multivalent salts. Some examples of suitable salts include the chlorides, sulfates, nitrates, and carboxylates of potassium, sodium, ammonium, calcium, and magnesium and mixtures of two or more of the foregoing salts.

Other materials that can be employed as low-temperature destabilizers include high molecular weight cationic, anionic, zwitterionic and uncharged polymers having a weight average molecular weight in the range of from about 1,000 Da to about 100,000 Da. Some examples of polymers useful as low-temperature destabilizers in the practice of the invention include polyacrylamides, polyvinyl alcohols, polyvinyl pyrrolidones, and polyacrylic acids. Suitable polymers can be water-soluble and two or more such polymers can be employed in a given indicator dispersion, if desired. Some suitable destabilizers are also described in Taylor '980, for example, at paragraphs 0302-0310 of Taylor '980.

The low-temperature destabilizer, if employed, can be selected for compatibility with a particular dispersion stabilizer employed in a given indicator dispersion. To illustrate, a polymeric destabilizer employed with an ionically stabilized indicator dispersion can carry an opposite charge to the charge carried by the indicator dispersion. For example, a cationic polymer including quaternary ammonium segments can be used to destabilize a stabilized indicator dispersion that employs an anionic stabilizer.

Proportions. A light-scattering freeze indicator dispersion employed in a freeze indicator embodiment can have any suitable proportions of ingredients compatible with providing a less colored before-freezing appearance and a more colored after-freezing appearance that has adequate contrast to the before-freezing appearance to provide a good freeze exposure signal.

Where a hydrophobic liquid is employed, the indicator dispersion can include at least about 5 percent, at least about 20 percent, at least about 30 percent, or at least about 40 percent of the hydrophobic liquid by weight. Optionally, the indicator dispersion can include not more than about 55 percent, not more than about 65 percent, or not more than about 75 percent of the hydrophobic liquid by weight. The range of useful variation of the proportion of hydrophobic liquid can lie between any one of the foregoing lower limits and any one of the foregoing upper limits. All proportions described herein are by weight, based upon the weight of the indicator dispersion, unless the context indicates otherwise. Other ingredients can be present in any suitable proportion. For example, the indicator dispersion can include a proportion by weight of an ice nucleant in a range of from about 0.01 percent to about 5 percent or from about 0.2 percent to about 2 percent. Also, the indicator dispersion can include a proportion by weight of a dispersion stabilizer in a range of from about 0.1 percent to about 10 percent or from about 0.5 percent to about 5 percent. Further, the indicator dispersion can include a proportion by weight of a protein stabilizer of from about 0.01 percent to about 1.0 percent or from about 0.05 percent to about 0.5 percent.

The aqueous liquid medium can make up the balance of the indicator dispersion. For example, depending upon the proportions of other ingredients present, the indicator dispersion can include from about 30 percent to about 95 percent, or from about 40 percent to about 60 percent of the aqueous liquid medium.

Some embodiments of freeze indicator consist exclusively of an aqueous liquid medium, colored indicator agent particles and, optionally, one or more of a hydrophobic material, an ice nucleant, a protein stabilizer, a dispersion stabilizer, a low-temperature destabilizer, and a biocide. Each of the ingredients can include more than one material, if desired. Other embodiments of freeze indicators can include an additional ingredient or ingredients.

With respect to indicator dispersions that are water-in-oil emulsions, in some embodiments, the aqueous phase can include a colorant with a strong affinity for the aqueous phase and low affinity for the oil phase. One suitable aqueous phase may include a dispersion of carbon black in water, for example, a carbon black dispersion intended for a black aqueous ink. The carbon black dispersion may be diluted with distilled water to reduce the initial color intensity of the aqueous phase to reduce any excess color associated with the before freezing appearance of the indicator emulsion.

With respect to indicator dispersions that are water-in-oil emulsions, in some embodiments, the oil can be: a $C_{14}$ to $C_{18}$ aliphatic straight-chain or branched saturated hydrocarbon, such as for example, hexadecane, isohexadecane, pentadecane, heptadecane, octadecane, tetradecane, etc., and mixtures thereof; an ester, including butyl stearate, butyl myristate, tridecyl stearate, octastearate, isopropyl myristate, isocetyl myristate, isopropyl isostearate, etc. and mixtures thereof.

With respect to indicator dispersions that are water-in-oil emulsions, in some embodiments, an emulsifier and/or a surfactants could be used. Some examples of useful surfactants or emulsifiers include, but are not limited to, hydrophobic nonionic surfactants, such as sorbitan monooleate, polyoxyethylene sorbitan trioleate and sorbitan trioleate.

Some water-in-oil emulsions, such as water-in-oil emulsions that contain only non-ionic surfactants, may not coalesce sufficiently (or at all) to change the appearance of the indicator following freezing condition exposure. Such an emulsion can be deliberately destabilized, for example, by adding a salt of a polynuclear, aromatic sulfonic acid, to the mixture as a destabilizer. The sodium salt of xylene sulfonic acid is an example of a destabilizer. Other examples could include dodecylbenzylsulfonic acid (DDBSA), the sodium salt of xylene sulfonic acid (NAXSA), epoxylated and propoxylated compounds, anionic cationic and nonionic surfactants, resins such as phenolic and epoxide resins, etc.

Figure 2:
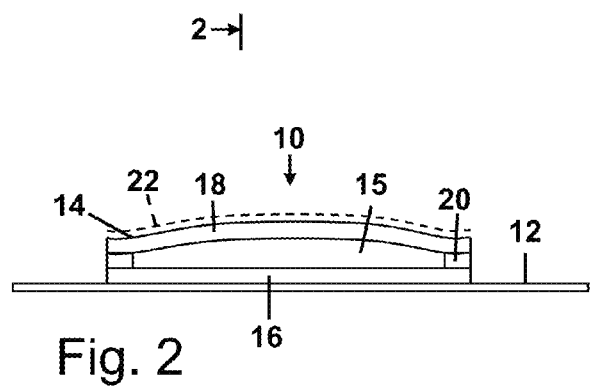
FIG. 2 is a sectional view on the line 2-2 of the freeze indicator shown in FIG. 1.

Referring now to FIGS. 1 and 2 of the accompanying drawings, the freeze indicator shown, referenced 10, includes a substrate 12 supporting an envelope 14 which contains a volume of an indicator dispersion 15 which can be any of the indicator dispersions described herein as being useful in freeze indicator embodiments. As shown, envelope 14 can be approximately circular. Alternatively, envelope 14 can have another desired shape, for example, oval, hexagonal, square, rectangular, strip-like or ring-like. Envelope 14, as shown, includes an inner wall 16 and an outer wall 18 joined together by a ring of adhesive 20, or joined in another suitable manner, for example by fusing. Also, the joint, or seal between inner wall 16 and outer wall 18 can have low permeability to water vapor. Alternatively, envelope 14 can be a one-piece sealed sac.

Inner wall 16 of envelope 14 can be adhered to, deposited on, or otherwise attached to, substrate 12 so as to attach envelope 14 to substrate 12. Alternatively, substrate 12 can provide inner wall 16 as an integral component of the substrate. For example, inner wall 16 can include a layer, or insert, of aluminum or other material substantially impermeable to water vapor and aqueous liquids, formed integrally with substrate 12 or as a separate element.

Outer wall 18 of envelope 14 includes a transparent window (not referenced) which can occupy approximately the entire footprint of envelope 14 on substrate 12, if desired. Alternatively, the transparent window can occupy a smaller area or the entire envelope 14 can be transparent. The transparent window enables an optical signal generated by freeze indicator 10, for example, a change in color, to be read externally by a suitable instrument, by a human viewer, by a camera, by an optical detector, or in another suitable manner. Envelope 14 can be formed of materials having a low permeability to water vapor to protect indicator dispersion 15 from drying out, if desired.

Optionally, outer wall 18 of envelope 14 can be provided with a color filter 22, for example, as a light-modulating coating of an ink, a lacquer, a paint, or another suitable coating material on outer wall 18. Alternatively, color filter 22, can be a separate element such as a separate layer. Color filter 22 can be transparent to enable the appearance of the indicator dispersion to be viewed through the filter. In one embodiment color filter 22 has a transparent green color, indicator dispersion 15 is light-colored before freezing, and is dark-colored or black after freezing, so that the freeze indicator shows a change from green before freezing to dark, or black, after freezing.

Figure 3:
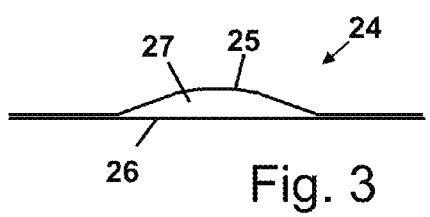
FIG. 3 is a view similar to FIG. 2 of a freeze indicator employing light scattering according to another embodiment.

The freeze indicator illustrated in FIG. 3, referenced 24, can be generally similar to that shown in FIGS. 1 and 2 with the differences that are apparent from the following description. Freeze indicator 24 can include an upper blister portion 25 and a lower substrate portion 26 defining between them an indicator volume 27 that can contain an indicator dispersion such as described herein. Upper blister portion 25 can be preformed from a synthetic polymeric film material, for example polyvinyl chloride. Also, substrate portion 26 can be formed in one piece with upper blister portion 25 and can be sealed to substrate portion 26 in any suitable manner, for example, by heat sealing or by use of an adhesive. Alternatively, blister portion 25 and substrate portion 26 can be formed in one piece. Freeze indicator 24 can be flexible, if desired, for example sufficiently flexible that substrate portion 25 can conform to the curved surface of a desired host product.

Freeze indicator 24 can be embodied in a variety of configurations, including relatively small configurations. One illustrative example of a small embodiment of freeze indicator 24 has a blister diameter (or equivalent dimension) of not more than about 4 mm, a blister height (the vertical dimension in FIG. 3) of not more than about 0.6 mm, and an indicator volume of not more than about 5 µL. Another example of a larger embodiment of freeze indicator 24 has a blister diameter (or equivalent dimension) of about 12 mm, a blister height (the vertical dimension in FIG. 3) of about 1.2 mm, and an indicator volume of about 80 µL. These dimensions are merely exemplary and freeze indicator 24 can have smaller or larger configurations.

Freeze indicator embodiments can have any suitable thickness in the direction of optical reading, for example, in the case of the freeze indicator illustrated in FIGS. 1 and 2, a thickness up to about 1 mm between inner wall 16 and outer wall 18 across the envelope 14 in which indicator dispersion 15 is accommodated. For some purposes, however, freeze indicator embodiments can have a thin or low profile, having a thickness of the indicator dispersion of from about 10 µm (micron,) to about 0.3 mm, for example.

In some embodiments, the indicator dispersion may have a thickness of less than about 1 mm, less than about 0.5 mm, less than about 0.2 mm, or less than about 0.1 mm.

Freeze indicator embodiments can have various other structural characteristics including any of the structural characteristics of the inventive freeze indicators described in Taylor '980.

Some illustrative and nonlimiting examples follow of the preparation and characterization of indicator dispersions useful in the practice of the invention.

Example 1

Preparation of a Light-Scattering Indicator Dispersion

In the following example, all parts are parts by weight based on the weight of the light-scattering indicator dispersion. To prepare a light-scattering indicator dispersion for a freeze indicator, 1 part Solvent Black BS (Orient Corp. of America, Seaford, Del.), which is an oil-soluble black dye, 5 parts of a nonionic surfactant (TERGITOL® 15-S-15, Dow Chemical, Midland, Mich.) and 44 parts of a partially hydrogenated terphenyl oil (MCS 2811 Solutia, St. Louis, Miss.) are added to a glass vial and heated to 80° C. using a water bath. A second vial containing 50 parts of distilled water is also heated to 80° C. A homogenizer (IKA Ultra-Turrax T-18) is inserted into the hot dye-in-oil solution and operated first at a low agitation speed setting until the temperature reaches 80° C. The agitation rate is then increased to a moderate speed setting. The hot distilled water then is added slowly to the hot dye-in-oil solution. After addition of 30 parts of the hot distilled water, the mixture suddenly turns from black to dark gray and is opaque, indicating inversion of the emulsion. During the addition, the mixture suddenly turns from black to dark gray and opaque, indicating inversion of the emulsion. The remainder of the hot water in the second vial is added, the heat is removed and the homogenizer is operated at low speed until the mixture has returned to a temperature near to ambient (about 20° C. to about 25° C.).

Example 1 demonstrates that a light-scattering indicator dispersion can be prepared by an inverse emulsion process to provide a product that is opaque and has a lighter appearance than the black oil phase of the dispersion. However, the difference between the before and after appearances may be inadequate to provide a satisfactory freeze indicator signal.

Example 2

Example 1 is repeated to prepare Samples A-F using smaller proportions of dye, as shown in Table 1.

TABLE 1

Composition of Option 1A Emulsion Formulations (parts)

| Sample | A | B | C | D | E | F |
|---|---|---|---|---|---|---|
| Terphenyl Oil | 44.25 | 44.88 | 44.94 | 44.99 | 44.995 | 44.998 |
| Oil Black BS dye | 0.75 | 0.12 | 0.06 | 0.01 | 0.005 | 0.002 |
| Surfactant | 5.0 | 5.0 | 5.0 | 5.0 | 5.0 | 5.0 |
| Distilled Water | 50 | 50 | 50 | 50 | 50 | 50 |
| Total | 100 | 100 | 100 | 100 | 100 | 100 |

TABLE 1B

Black intensity of Oil Black BS dye solution in terphenyl oil

| | \multicolumn{6}{c}{Sample} | |
|---|---|---|---|---|---|---|---|
| | A | B | C | D | E | F | Oil alone |
| Dye concentration in oil | 1.69% | 0.27% | 0.13% | 0.02% | 0.01% | 0.004% | 0 |
| Oil Black BS dye solution in terphenyl oil absorbance at 500 nm | 380* | 60* | 30* | 4.5 | 2.2 | 0.8 | 0.0 |

*Absorbance by extrapolation

The visual blackness of the oil solutions of black dye was clearly related to dye concentration. Direct measurement of absorbance at 500 nm with 10 mm path length of each solution and oil alone, was attempted using a Shimadzu UV-2700 Spectrometer. Samples A, B, and C were too intense to measure directly. Samples D, E, F and dye-free oil gave absorbance vales within the reliable range of the instrument—they were also linear with concentration and therefore able to be used to calculate absorbance of the higher concentration samples A, B and C by extrapolation.

Figure 4:
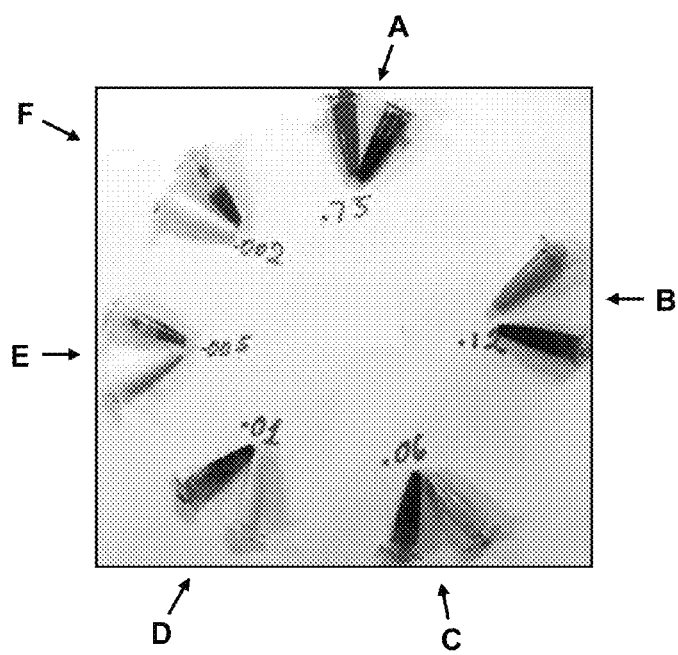
FIG. 4 is a view of a number of samples of freeze indicator dispersions showing their before-freezing appearances and their after-freezing appearances.

The before-freezing and after-freezing appearances of Samples A-F are shown in FIG. 4. Referring to FIG. 4, a before-freezing vial and an after-freezing vial for each of the six Samples A-F is shown. The vials are arranged side-by-side in a circle, with the vials for Sample A at the top of the figure. The before-freezing vials are lighter in color than the corresponding after-freezing vials, which are adjacent the before-freezing vials in the clockwise direction. The weight proportion of dye-in-oil solution for each sample is shown next to the inward ends of each pair of vials. The vials are illuminated from the top left, as viewed in FIG. 4, so that the right hand side of some vials is partially shaded, darkening the appearance of that side of the vial. In each case, the indicator dispersion has a homogenous, opaque before-freezing appearance and the white samples, Samples B-F, have a creamy appearance. Also, the after-freezing appearance of the indicator dispersion of each sample is substantially darker than the before-freezing appearance, consistently with the indicator dispersion having coagulated to reveal the dark appearance of the black-dyed oil.

Sample A, employing 0.75 percent dye-in-oil solution by weight, has a dark grey appearance before freezing and a black appearance after freezing. The average particle size of the oil droplets in Sample A is about 1 μm.

Sample B, employing 0.12 percent dye-in-oil solution by weight, has a medium grey appearance before freezing and a black appearance after freezing. The average particle size of the oil droplets in Sample A is about 1.6 μm.

Sample C, employing 0.06 percent dye-in-oil solution by weight, has a light grey appearance before freezing and a black appearance after freezing. The average particle size of the oil droplets in Sample C is about 1.4 μm.

Sample D, employing 0.01 percent dye-in-oil solution by weight, has an off-white appearance before freezing and a black appearance after freezing. The average particle size of the oil droplets in Sample A is about 1.1 μm.

Sample E, employing 0.005 percent dye-in-oil solution by weight, has an opaque, off-white appearance before freezing and a black appearance after freezing. The average particle size of the oil droplets in Sample E is about 700 nm.

Sample F, employing 0.002 percent dye-in-oil solution by weight, has an opaque, bright, white appearance before freezing and a black appearance after freezing. The average particle size of the oil droplets in Sample F is about 700 nm.

Samples D, E and F provide a strong contrast between the before-freezing and after-freezing appearances. These samples exhibit a light, bright, opaque before-freezing appearance and an intense black post-freezing appearance, providing a striking color change that would make a good indicator signal. Samples D, E and F appear to be suitable for use in a freeze indicator.

Example 2 and the results shown in FIG. 4 illustrate how a suitable concentration of colorant, in this case, a black dye, can provide an appropriately light before-freezing appearance and an appropriately dark after-freezing appearance can be determined by simple experimentation. The concentrations of Oil Black BS dye employed in Samples A, B, and C provide dark before-freezing appearances whereas the proportions employed in Samples D, E and F provide useful light before-freezing appearances and satisfactorily dark after-freezing appearances. The actual color of the oil, as measured by absorbance, demonstrates the same relationship. Oil solutions that have absorbance of 30 or more produce emulsions that appear dark before-freezing, while those with absorbance of 4.5 and lower produce emulsions that appear to have useful light-before freezing appearances and satisfactorily dark after-freezing appearances. Further, there is a substantial absorbance range from Sample D (4.5) to Sample F (0.8) providing acceptable appearances within which a skilled person can work to provide the desired before-freezing and after-freezing appearances using a particular colorant. The concentration of dye required to provide good or optimal before-freezing and after-freezing appearances is likely to vary widely between colorants according to the intensity of the particular colorant employed, although the absorbance is likely to remain in or near the range defined by these samples.

Example 3

Preparation of a Light-Scattering Indicator Emulsion

In the following examples, the term "parts" refers to parts by weight based on the weight of the light-scattering indicator emulsion. To prepare this example of light-scattering indicator emulsion for a freeze indicator, 49.65 parts of partially hydrogenated terphenyl oil (MCS 2811 Solutia, St. Louis, Mo.) is added to a glass griffin beaker with magnetic stir bar and heated with stirring to 105° C.-110° C. with a stirring hot plate. To that is added 0.025 parts Nigrosine Black EEL (Orient Corp. of America, Seaford, Del.), an oil-soluble black dye, 0.325 parts sodium dioctyl sulfosuccinate (Aerosol OT 100%, Cytec Industries, Inc., Woodland Park, N.J.) an ionic surfactant. Continue stifling 30 min, then vacuum filter hot through a 410 filter paper with Buchner funnel. This oil/dye/surfactant solution is transferred to a clean glass beaker, the temperature adjusted to 70° C. and a homogenizer (IKA Ultra-Turrax T-18) is inserted into the hot dye-in-oil solution and operated at a low agitation speed (1). 50 parts of deuterium oxide (Cambridge Isotope Laboratories, Inc., Andover Mass.) is warmed to 70° C. in a separate beaker and added slowly to the beaker of oil/dye/surfactant solution and the homogenizer rate increased to 4-5. During the addition, the mixture suddenly turns from black to opaque light gray. The stirrer is removed from the beaker and the beaker with emulsion covered and set on the bench counter at ambient conditions (1-2 hr). The above emulsion is further processed in a high-pressure homogenizer (Nano DeBee, Bee International, South Easton, Mass.) at an operating pressure of 5000 psi.

After the high-pressure homogenization the emulsion is characterized by visual and instrumental analysis: Z-average particle diameter 410 nm and polydispersity index 0.38; pH 7.1. The opacity of the emulsion as determined by use of a Pfund Cryptometer (BYK—Gardner USA, Columbia, Md.) with a 0.007 top plate yields the obscuring of the black/white boundary at a scale reading of 19 mm which corresponds to a film thickness of 0.13 mm. The color is white, slight grey with optical density 0.4. The optical density of the emulsion was determined by reading through the optically clear wall of a container filled with the emulsion with a densitometer (X-Rite 504, X-Rite, Inc., Grand Rapids, Mich.). The container with emulsion is placed in a freezer (−10° C. 15 m) and appears dark grey when removed from the freezer. This container with emulsion when analyzed for optical density in the above manner yields an OD of 1.3. The arithmetic difference of the post-freeze mixture minus the optical density before freezing is referred to as the change in optical density or $\Delta OD$. In the above example the $\Delta OD$ is 0.9.

The light scattering emulsion described above is observed to have continuing stability at 60 days with regards to particle size, pH, opacity, and visual appearance.

Example 4

The procedure of Example 3 is followed to make a light scattering emulsion with stearyl ether polypropylene glycol (Lipocol-15, Lipo Chemicals, Paterson, N.J.) in place of the partially hydrogenated terphenyl oil used in Example 3.

After the high-pressure homogenization the emulsion is characterized by visual and instrumental analysis: Z-average particle diameter 500 nm and polydispersity index 0.11; pH 7.7. The opacity of the emulsion as determined by use of a Pfund Cryptometer (BYK—Gardner USA, Columbia, Md.) with a 0.007 top plate yields the obscuring of the black/white boundary at a scale reading of 44 mm which corresponds to a film thickness of 0.32 mm. The color is light grey with optical density 0.6. After freezing the optical density is 1.6; providing a $\Delta OD$ of 1.0.

Example 5

The procedure of Example 3 is followed in its entirety and additional components added as described herein: 99.5 parts of the emulsion processed by high-pressure homogenization is combined with 0.25 parts of Snomax Snow Inducer (Johnson Controls Snow, Centennial, Colo.) and the mixture is stirred 1 min followed by addition of 0.25 parts gluteraldehyde solution (Grade I, 50%, Sigma-Aldrich Corp., St. Louis, Mo.) and continue stirring for 1 min.

The freezing point of the emulsion is determined by direct, visual observation of 25 replicate emulsion samples in 0.2 mL polypropylene PCR tubes with cap (Fisherbrand, Thermo Fisher Scientific, Inc., Waltham, Mass.) in a temperature controlled fluid bath (Fluke Calibration, Everett, Wash.). The tubes are mounted in a submersible rack device designed to accommodate 25 PCR tubes. Each tube is charged with a measured amount of freeze indicating emulsion and sealed with the cap. The rack with samples is submerged in the bath media and the temperature is lowered in 0.1° C. increments beginning at 1.0° C. and continued until all samples have frozen. Emulsion sample freezing is observable by the change in the emulsion from opaque white to black as seen through the transparent PCR tube. The results of freezing point determination over a range of sample volumes are summarized in Table 2.

TABLE 2

Effect of Sample Volume on Freeze Onset and Appearance

| Sample Vol. (μL) | Mean Freeze Onset (° C.) | Std. Deviation | Appearance (initial/frozen) |
|---|---|---|---|
| 80 | −0.1 | 0.1 | Slight gray/black |
| 20 | −0.3 | 0.1 | Slight gray/black |
| 10 | −0.5 | 0.1 | Slight gray/black |
| 5 | −0.3 | 0.2 | Slight gray/black |

Freeze indicator embodiments can be used with a variety of freeze-sensitive host products to indicate historically possible exposure of the host product to a freezing temperature. Suitable host products include any freeze-sensitive commercial product, for example, freeze-sensitive health care products, vaccines, drugs, medicaments, pharmaceuticals, biological pharmaceuticals, freeze-sensitive foodstuffs, or freeze-sensitive industrial products. Some other freeze-sensitive host products that can be monitored by freeze indicator embodiments are described in the Taylor et al. patent publications cited herein or will be known or apparent to a person of ordinary skill in the art, in light of this disclosure, or will become known or apparent in the future.

Example 6

TABLE 3

| Component | Description | Parts |
|---|---|---|
| 1 | n-Hexadecane | 64 |
| 2 | Sorbitan monooleate | 8 |
| 3 | Polyoxyethylene sorbitan monooleate | 5.6 |
| 4 | Sorbitan trioleate | 2.4 |
| 5 | Highly colored aqueous dispersion | 20 |

A water-in-oil emulsion for use as an indicator dispersion can be made as follows using the components listed in Table 3. The emulsifier and surfactants (sorbitan monooleate, polyoxyethylene sorbitan monooleate, and sorbitan trioleate) are added to the oil phase and mixed for approximately 2-3 minutes with a homogenizer running at high speed. If solubilization is incomplete, the mixture can be heated to about 60 to 80° C. with a hot plate. The aqueous phase is added slowly to the oil phase (hot or cold) with continued mixing with the homogenizer. Mixing is continued for a short period after all the aqueous mixture has been added. If hot, the emulsion is permitted to cool with slow stifling.

This formula described above is for an indicator intended to respond at temperatures below about 18° C., the freezing point of hexadecane. For a conventional freeze indicator, the oil phase could be made from dodecane ethyl ester, with a freezing temperature of about −2° C., for example.

The desired result will be a system in which a strongly colored aqueous phase is incorporated in water-in-oil emulsion whereby the emulsion has significantly less color before exposure to temperatures below the freezing point of either the oil or the aqueous phase. Exposure to decreasing temperatures will cause such emulsions to "break" once freezing occurs, resulting in a permanent, visually apparent change in appearance that can be utilized in the development of an indicator.

Some embodiments include a freeze-sensitive host product having a freeze indicator embodiment associated with it.

Disclosures Incorporated.

The entire disclosure of each United States patent, each United States patent application, each international patent publication, each foreign patent publication, any other publication, and of each unpublished patent application identified in this specification is incorporated by reference herein, in its entirety, for all purposes. Should a conflict appear to be present between the meaning of a term employed in the description of the invention in this specification and the usage of the term in material incorporated by reference from another document, the meaning of the term as used herein is intended to prevail. Any reference to an "invention" in any incorporated disclosure is to be understood to refer to the invention described, or claimed, in the incorporated disclosure.

About this Description.

The detailed description herein is to be read in light of and in combination with the descriptions of the background to the invention and of the brief summary of the invention where information regarding the written description of the invention, the best mode of practicing the invention, or description of modifications, alternatives or other useful embodiments may also be set forth explicitly, or implied, as will be apparent to one skilled in the art.

The terms "include," "have," "has," and "contain," and their various grammatical forms, are to be understood as being open-ended and not to exclude additional, unrecited elements or method steps.

Throughout the description, where compositions instruments, devices apparatus, systems, or processes are described as having, including, or comprising specific components or elements, or in the case of processes, specific steps, it is contemplated that compositions instruments, devices apparatus, systems, or processes according to the present invention can also consist essentially of, or consist of, the recited components, elements or steps.

In this application, where an element or component is said to be included in and/or selected from a list or group of recited elements or components, it should be understood that the element or component can be any one of the recited elements or components, or can be selected from a group consisting of two or more of the recited elements or components.

The use of the singular herein is intended to include the plural (and vice versa) unless the context indicates otherwise.

Also, where the term "about", "approximate", "approximately", or a similar term, is used before a quantitative value, the specific quantitative value itself is to be understood to be included, and to be explicitly recited, unless the description specifically states otherwise.

With regard to processes, it is to be understood that the order of steps or order for performing certain actions is immaterial so long as the described process remains operable. Moreover, two or more steps or actions may be conducted simultaneously, unless the context indicates otherwise. In addition, any proportions recited herein are to be understood to be proportions by weight, based upon the weight of the relevant composition, unless the context indicates otherwise. Also, unless the context indicates otherwise, or suggests otherwise, any methods that are described herein, or one or more steps of the methods, can be practiced at a room temperature in the range of about 20° C. to about 25° C.

The description of the background of the invention herein may include insights, discoveries, understandings or disclosures, or associations together of disclosures, that were not known in the relevant art prior to the present invention but which are provided by the invention, and are to be considered elements of the invention. Some such contributions of the invention may have been specifically pointed out as being attributable to the invention, and other such contributions of the invention will be apparent from their context. Merely because a document may have been cited in this application, no admission is made that the field of the document, which may be quite different from that of the invention, is analogous to the field or fields of the present invention.

The description of the invention herein is to be understood as including combinations of the various elements of the invention, and of their disclosed or suggested alternatives, including alternatives disclosed, implied or suggested in any one or more of the various methods, products, compositions, systems, apparatus, instruments, aspects, embodiments, examples described in the specification or drawings, if any, and to include any other written or illustrated combination or grouping of elements of the invention or of the possible practice of the invention, except for groups or combinations of elements that are incompatible with, or contrary to the purposes of the invention, as will be, or will become, apparent to a person of ordinary skill. Further, embodiments can have any configuration that is described herein, or is shown in any accompanying drawings, and can employ any compatible ones of the useful materials or structures described herein.

Scope of the Invention.

The present invention includes the examples and embodiments described herein and other specific forms of the invention that embody the spirit or essential characteristics of the invention or of the respective described examples or embodiments. The foregoing examples and embodiments are in all respects intended to be illustrative of the invention described herein. It is to be understood that many and various modifications of the invention, or of an example or embodiment described herein will be apparent to those of ordinary skill in the relevant art, or may become apparent as the art develops, in the light of the foregoing description. Such modifications are contemplated as being within the spirit and scope of the invention or inventions disclosed herein.

The invention claimed is:

1. An indicator dispersion comprising:
   a liquid medium; and
   particles of a colored indicator agent dispersed in the liquid medium, the colored indicator agent particles having an inherent color;
wherein the indicator dispersion exhibits the inherent color of the colored indicator agent particles after freezing and is configured to have a less colored appearance before freezing and wherein light scattering masks the inherent color of the colored indicator agent particles before freezing; and
wherein the indicator dispersion is free of color-changing chemical co-reactants.

2. The indicator dispersion of claim 1, wherein the liquid medium is a hydrophobic liquid medium.

3. The indicator dispersion of claim 1, wherein the liquid medium is an aqueous liquid medium.

4. The indicator dispersion of claim 3, wherein the particles of the colored indicator agent comprise a colorant dissolved or dispersed in a hydrophobic liquid.

5. The indicator dispersion of claim 4, wherein the colorant is a dye and the hydrophobic liquid is an oil.

6. The indicator dispersion of claim 1, wherein the particles of the colored indicator agent comprise solid particles of a colorant dissolved or dispersed in a solid material.

7. The indicator dispersion of claim 1, wherein the indicator dispersion coalesces in response to exposure of the indicator dispersion to a freezing temperature.

8. The indicator dispersion of claim 1, wherein the particles of the colored indicator agent have an absorbance at 500 nm of about 1 to about 30.

9. The indicator dispersion of claim 1, wherein the particles of the colored indicator agent have an average particle size of at least about 100 nm, and of not more than about 2 µm.

10. The indicator dispersion of claim 1, wherein the thickness of the dispersion is less than 1 mm.

11. The indicator dispersion of claim 1, wherein the after-freezing appearance of a layer of the indicator dispersion having a thickness of 1 mm is at least 0.4 optical density units darker than the before-freezing appearance of the layer of the indicator dispersion.

12. The indicator dispersion of claim 1, wherein the particles of the colored indicator agent are homogenous and no other indicator particles are present in the indicator dispersion.

13. The indicator dispersion of claim 1, wherein the indicator dispersion comprises an ice-nucleating agent.

14. A freeze indicator comprising:
a housing; and
the indicator dispersion of claim 1 within the housing, the housing being configured for the indicator dispersion to be optically readable externally of the freeze indicator.

15. The freeze indicator of claim 14, comprising a substrate supporting the housing, the housing and substrate optionally being flexible.

16. An article of manufacture comprising the freeze indicator of claim 14.

17. The article of manufacture of claim 16, which is a host product having the freeze indicator associated with the host product to monitor the host product for exposure to a freezing temperature.

18. The article of manufacture of claim 16, which is a label for a perishable good, comprising the freeze indicator.

19. The article of manufacture of claim 16, which is a package for a perishable good, comprising the freeze indicator.

20. The article of manufacture of claim 16, which is a package containing a perishable good, comprising the freeze indicator of.

* * * * *